US009053522B2

(12) United States Patent
Nakano

(10) Patent No.: US 9,053,522 B2
(45) Date of Patent: Jun. 9, 2015

(54) IMAGE PROCESSING DEVICE, IMAGE PROCESSING METHOD, AND IMAGE PROCESSING PROGRAM

(75) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 308 days.

(21) Appl. No.: 13/699,216

(22) PCT Filed: May 18, 2011

(86) PCT No.: PCT/JP2011/002765
§ 371 (c)(1),
(2), (4) Date: Nov. 20, 2012

(87) PCT Pub. No.: WO2011/148595
PCT Pub. Date: Dec. 1, 2011

(65) Prior Publication Data
US 2013/0064430 A1 Mar. 14, 2013

(30) Foreign Application Priority Data

May 26, 2010 (JP) ................................. 2010-121018

(51) Int. Cl.
*G06K 9/32* (2006.01)
*G06T 3/00* (2006.01)
(52) U.S. Cl.
CPC *G06T 3/00* (2013.01); *G06T 3/0093* (2013.01)
(58) Field of Classification Search
None
See application file for complete search history.

(56) References Cited

U.S. PATENT DOCUMENTS

| 6,912,293 | B1 * | 6/2005 | Korobkin ...................... 382/100 |
| 7,228,006 | B2 * | 6/2007 | Stubler et al. ................. 382/286 |
| 8,355,579 | B2 * | 1/2013 | LeMoigne-Stewart et al. ............................ 382/190 |
| 2004/0041808 | A1 * | 3/2004 | Ban et al. ...................... 345/419 |

(Continued)

FOREIGN PATENT DOCUMENTS

| JP | H100149455 A | 6/1998 |
| JP | 2001290585 A | 10/2001 |

(Continued)

OTHER PUBLICATIONS

The international search report for PCT/JP2011/061577 mailed on Jun. 21, 2011.

*Primary Examiner* — Shervin Nakhjavan
(74) *Attorney, Agent, or Firm* — Sughrue Mion, PLLC

(57) ABSTRACT

An image processing device comprises: image display means which displays at least one of transformation target images containing an object of interest; first reference point receiving/determining means which receives information on first reference point candidates according to a user operation, receives according to a user operation a determination signal targeted at the first reference point candidates displayed on the transformation target image based on the information on the first reference point candidates, and determines first reference points based on the information on the first reference point candidates targeted by the received determination signal; second reference point receiving/determining means which determines second reference points by receiving information on the second reference points; and geometric transformation means which outputs a transformed image by conducting geometric transformation to the transformation target image based on the first reference points determined by the first reference point receiving/determining means and the second reference points determined by the second reference point receiving/determining means.

9 Claims, 8 Drawing Sheets

(56) References Cited

U.S. PATENT DOCUMENTS

2004/0247174 A1* 12/2004 Lyons et al. ............... 382/154
2005/0059886 A1* 3/2005 Webber ...................... 600/426
2005/0094898 A1* 5/2005 Xu et al. .................... 382/294
2007/0053679 A1 3/2007 Beniyama et al.
2008/0253685 A1* 10/2008 Kuranov et al. ........... 382/284

FOREIGN PATENT DOCUMENTS

| | | |
|---|---|---|
| JP | 2004264492 A | 9/2004 |
| JP | 2005049999 A | 2/2005 |
| JP | 2007072537 A | 3/2007 |
| JP | 2008217243 A | 9/2008 |

* cited by examiner

IMAGE PROCESSING DEVICE, IMAGE PROCESSING METHOD, AND IMAGE PROCESSING PROGRAM

TECHNICAL FIELD

The present invention relates to an image processing device, an image processing method and an image processing program. In particular, the present invention relates to an image processing device, an image processing method and an image processing program for generating images for three-dimensional display of an object of interest from a plurality of transformation target images containing the object of interest.

BACKGROUND ART

There exists an expression method for making three-dimensional display by successively performing image switching (switching images of an object of interest shot in various angles) according to a user operation. In order to present an easily viewable three-dimensional image to the user, the object of interest is desired to be situated at the center of each image.

Examples of methods for shooting images of an object of interest whole placing the object of interest at the center of each image have been described in Patent Literatures 1-3. In a shooting method described in the Patent Literature 1, the object of interest is shot in various angles by using a plurality of cameras and support parts for supporting the cameras.

An image shooting device (photographing device) described in the Patent Literature 2 shoots the object of interest in various angles by using a plurality of cameras and a turntable connected to a computer.

In an image input method described in the Patent Literature 3, the object of interest is shot in various angles by using a camera that is not fixed. A two-dimensional geometric transformation matrix for uniformizing the center position of the object of interest in each image is calculated from posture information on the camera detected by a posture detecting unit, and image transformation is conducted to each image by using the calculated two-dimensional geometric transformation matrix.

CITATION LIST

Patent Literature

Patent Literature 1: JP-A-2004-264492
Patent Literature 2: JP-A-2007-72537
Patent Literature 3: JP-A-2005-49999

SUMMARY OF INVENTION

Technical Problem

In the methods and devices described in the Patent Literatures 1-3, however, not only a single camera but also a large number of devices (a plurality of cameras set at fixed positions, a turntable for setting the object of interest, an acceleration sensor, etc.) are necessary in order to place the object of interest at the center of each image.

For example, in the shooting method described in the Patent Literature 1, a large number of devices such as a plurality of camera mounts (camera platforms) for fixing the cameras and support frames, support arms and posts for supporting the camera mounts are necessary as the support parts. Further, the photographer has to arrange the cameras in a single line, in a single arc, on a single plane or on a single shape and the preparation process necessary before the shooting is extremely complicated.

In the image shooting device described in the Patent Literature 2, the operation of the turntable is controlled by the computer. The cameras are set at even intervals on an arc-shaped image shooting device setting table. The photographer does not have to have a detailed knowledge of cameras, machining, etc. since the shooting can be started only by setting the object of interest on the turntable. However, a large number of devices are necessary in addition to the camera similarly to the method of the Patent Literature 1.

The image input method described in the Patent Literature 3 does not need a plurality of cameras or a setting table for fixing the cameras, and thus the photographer has only to shoot the object of interest with a camera. However, the image input method needs extra devices other than the camera such as a posture detecting device (acceleration sensor, magnetism sensor, etc.) similarly to the method/device of the Patent Literatures 1 and 2.

It is therefore an exemplary object of the present invention to provide an image processing device, an image processing method and an image processing program capable of generating images for three-dimensional display from images shot with a single camera without the need of using other devices such as the turntable for setting the object of interest and the acceleration sensor.

Solution to Problem

In accordance with an exemplary aspect of the present invention, there is provided an image processing device which generates images for three-dimensional display of an object of interest from a plurality of transformation target images containing the object of interest, comprising: image display means which displays at least one transformation target image; first reference point receiving/determining means which receives information on first reference point candidates as candidates for first reference points serving for reference in input of geometric transformation according to a user operation, receives according to a user operation a determination signal targeted at the first reference point candidates displayed on the transformation target image based on the information on the first reference point candidates, and determines the first reference points based on the information on the first reference point candidates targeted by the received determination signal; second reference point receiving/determining means which determines second reference points serving for reference in output of the geometric transformation by receiving information on the second reference points; and geometric transformation means which outputs a transformed image by conducting the geometric transformation to the transformation target image based on the first reference points determined by the first reference point receiving/determining means and the second reference points determined by the second reference point receiving/determining means.

In accordance with another exemplary aspect of the present invention, there is provided an image processing method for generating a three-dimensional image by conducting geometric transformation to each of transformation target images as a plurality of images containing an object of interest, comprising: displaying at least one transformation target image by using image display means; receiving information on first reference point candidates as candidates for first reference points serving for reference in input of geometric transformation according to a user operation; displaying the first reference point candidates on the transformation target image based on the received information on the first reference point candidates; receiving a determination signal targeted at the first reference point candidates displayed on the transformation target image according to a user operation; determining the first reference points based on the information on the first reference point candidates targeted by the received determination signal; determining second reference points serving for reference in output of the geometric transformation by receiving information on the second reference points; and outputting a transformed image for each transformation target image by conducting the geometric transformation to the transformation target image based on the determined first and second reference points.

In accordance with another exemplary aspect of the present invention, there is provided an image processing program for generating a three-dimensional image by conducting geometric transformation to each of transformation target images as a plurality of images containing an object of interest, wherein the image processing program causes a computer to execute: a process of displaying at least one transformation target image by using image display means; a process of receiving information on first reference point candidates, as candidates for first reference points serving for reference in input of geometric transformation, which is inputted according to a user operation and thereby displaying the first reference point candidates on the transformation target image; a process of determining the first reference points based on the information on the first reference point candidates targeted by a determination signal when the determination signal, inputted according to a user operation for the first reference point candidates displayed on the transformation target image, is received; a process of determining second reference points serving for reference in output of the geometric transformation when information on the second reference points is received; and a process of conducting the geometric transformation to the transformation target image based on the first reference points and the second reference points.

Advantageous Effects of the Invention

According to the present invention, images for three-dimensional display can be generated from images shot with a single camera without the need of using other devices such as the turntable for setting the object of interest and the acceleration sensor.

DESCRIPTION OF EMBODIMENTS

<First Exemplary Embodiment>

Figure 1:
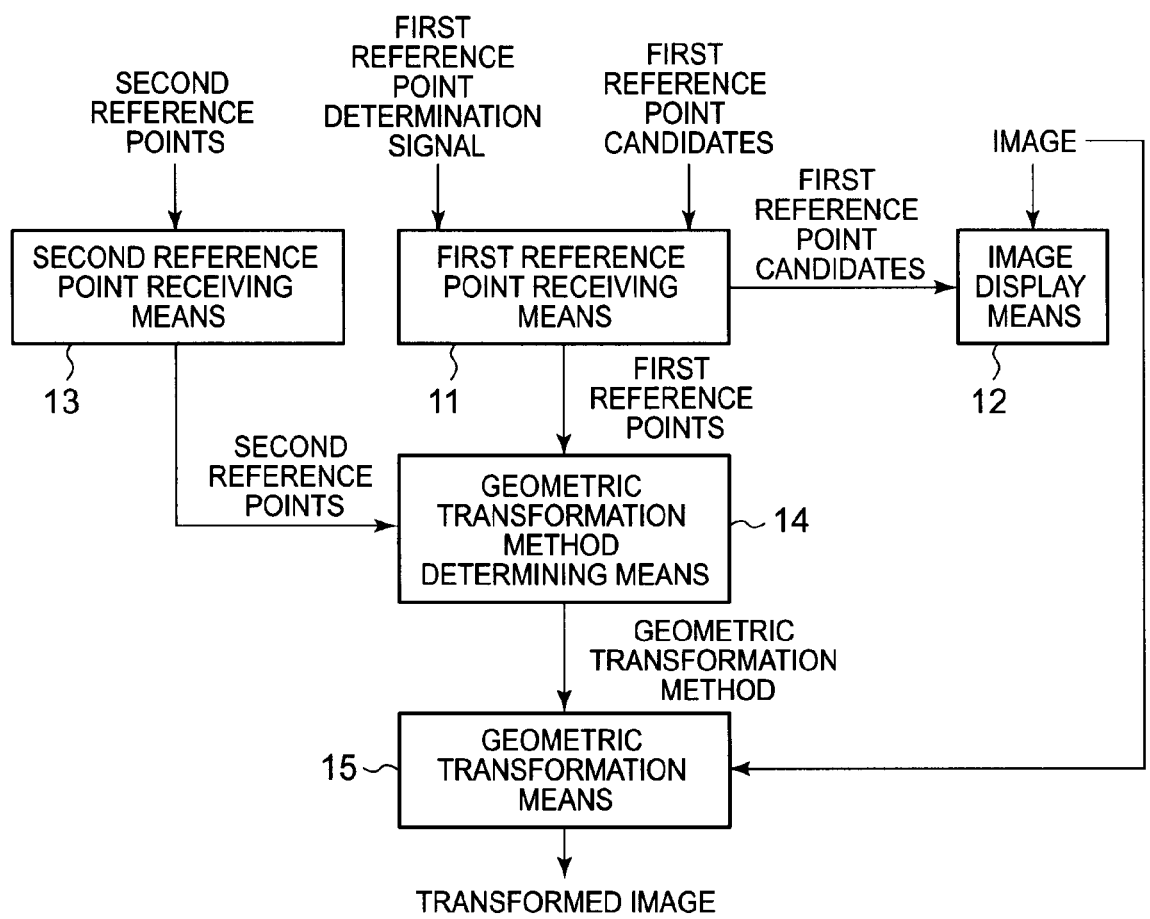
[FIG. 1] It depicts a block diagram showing an example of the configuration of a first exemplary embodiment.

Referring now to the drawings, a description will be given in detail of exemplary embodiments in accordance with the present invention. FIG. 1 is a block diagram showing an example of the configuration of an image processing device in accordance with a first exemplary embodiment of the present invention. The image processing device shown in FIG. 1 comprises first reference point receiving means 11, image display means 12, second reference point receiving means 13, geometric transformation method determining means 14 and geometric transformation means 15.

The first reference point receiving means 11 receives first reference point candidates (candidates for first reference points) as a user input in regard to each of images containing an object under consideration (hereinafter referred to as "transformation target images"). The first reference point receiving means 11 also receives a determination signal targeted at the received first reference point candidates and thereby determines the first reference points.

The first reference points are reference points on the input side, which are included in points serving for reference in the input and the output of the geometric transformation. In other words, the first reference points are reference points that are represented by positional information (image coordinates) in the coordinate system of the transformation target image. The first reference points are set for each of the transformation target images. The reference points can be, for example, two or more points forming a camera rotation axis in the three-dimensional image (e.g., 360-degree rotation image of the object of interest) that should be expressed by transformed images. Incidentally, the "camera rotation axis" is not the rotation axis of the camera actually used for shooting the images but an axis that the user wants to use as the center of camera movement in the three-dimensional image obtained as the result. While the number of points necessary as the reference points (the number of corresponding points) can be set depending on the method of the geometric transformation, the number is two or more in any method. Second reference points are reference points on the output side, that is, points as the results (destinations) of the transformation of the first reference points. In other words, the second reference points are reference points that are represented by positional information in the coordinate system of the transformed image. Each pair of first and second reference points has a correspondence relationship in that the two points (first and second reference points) have image coordinates acquired by projection of the same three-dimensional coordinates. In the generation of the three-dimensional image, it is desirable that the same (common) sets of three-dimensional coordinates be used for the reference points among the transformation target images, like the two or more points forming the camera rotation axis.

The first reference point receiving means 11 may receive the first reference point candidates by, for example, inputting information on the first reference point candidates (e.g., positional information) according to a user operation that is performed for each transformation target image displayed on the image display means 12. The first reference point receiving means 11 may display the received first reference point candidates on the transformation target image by use of the image display means 12. Incidentally, when the information on the first reference point candidates has been changed, the first reference points are moved on the transformation target image based on the information. The information on the first reference point candidates is inputted by means of pointing with a mouse or through a keyboard, for example. Finally, the first reference point receiving means 11 may receive a first reference point determination signal (information instructing that the first reference point candidates targeted by the first reference point determination signal should be determined as the first reference points) and determine the first reference point candidates at that time as the first reference points. Incidentally, the first reference point receiving means 11 determines at least two points as the first reference points.

The first reference point receiving means 11 may also be configured to first display two points, previously set as initial values (initial points) of the first reference points, in the drawing area of the operation screen and thereafter let the user move the two points.

After determining the first reference points, the first reference point receiving means 11 outputs the determined first reference points to the geometric transformation method determining means 14.

The image display means 12 displays images. In this exemplary embodiment, the image display means 12 displays each transformation target image, displays an image generated by superimposing the first reference points on the transformation target image, and so forth. The image display means 12 may also display each transformed image (image after the transformation), display the second reference points in the frame of the transformed image, and so forth. The image display means 12 may display image information of operation screens including these displays, for example.

The second reference point receiving means 13 receives the second reference points as the results (destinations) of the transformation of the first reference points, and outputs the received second reference points to the geometric transformation method determining means 14. For example, in the case where the first reference points are multiple sets of image coordinates representing the positions of (two or more) points forming the camera rotation axis in the transformation target image, the second reference points may be specified as multiple sets of image coordinates representing positions in the transformed image to which the points forming the camera rotation axis should be projected. The second reference point receiving means 13 may make the user set (input) the second reference points each time similarly to the first reference points. Alternatively, the second reference points may also be set previously. Each of the second reference points is set while associating it with each (corresponding one) of the first reference points. In the case where the second reference points are set previously, loading (readout) of the setting information on the second reference points corresponds to the inputting of the second reference points. The second reference points can also be set as values common to all the transformed images. For example, the position (image coordinates) of the camera rotation axis may be set so that the object of interest is situated substantially at the center in every transformed image.

The geometric transformation method determining means 14 determines the geometric transformation method to be conducted to each transformation target image based on the first reference points outputted from the first reference point receiving means 11 and the second reference points outputted from the second reference point receiving means 13. More specifically, the geometric transformation method determining means 14 determines parameters of transformation equations for the geometric transformation to be conducted to the transformation target image (coordinate transformation equations). For example, the geometric transformation method determining means 14 may determine, according to a previously set transformation method, the parameters of prescribed transformation equations to be used for the transformation method (coordinate transformation equations) based on the necessary numbers of first and second reference points which have been set for each transformation target image. The geometric transformation method determining means 14 outputs the determined parameters or information on the coordinate transformation equations including the determined parameters to the geometric transformation means 15 as information representing the geometric transformation method.

The geometric transformation means 15 conducts the geometric transformation to each transformation target image according to the geometric transformation method determined by the geometric transformation method determining means 14 and outputs the transformed image. The geometric transformation means 15 acquires the transformed image by, for example, transforming the pixel information on the transformation target image by using the coordinate transformation equations inputted as the information representing the geometric transformation method. This transformation process includes a process of compensating for the pixel loss by performing the interpolation for the image coordinates after the transformation. Incidentally, the geometric transformation means 15 may also be configured to have the function of the geometric transformation method determining means 14, that is, the geometric transformation method determining means 14 may also be implemented inside the geometric transformation means 15.

The first reference point receiving means 11 and the second reference point receiving means 13 are implemented by, for example, an information input device (mouse, keyboard, touch panel, etc.) and a CPU operating according to a program. The image display means 12 is implemented by, for example, an image display device (monitor, projector, etc.) and a CPU operating according to a program. The geometric transformation method determining means 14 and the geometric transformation means 15 are implemented by, for example, hardware designed to perform particular calculation processes, etc. and a CPU operating according to a program.

Figure 2:
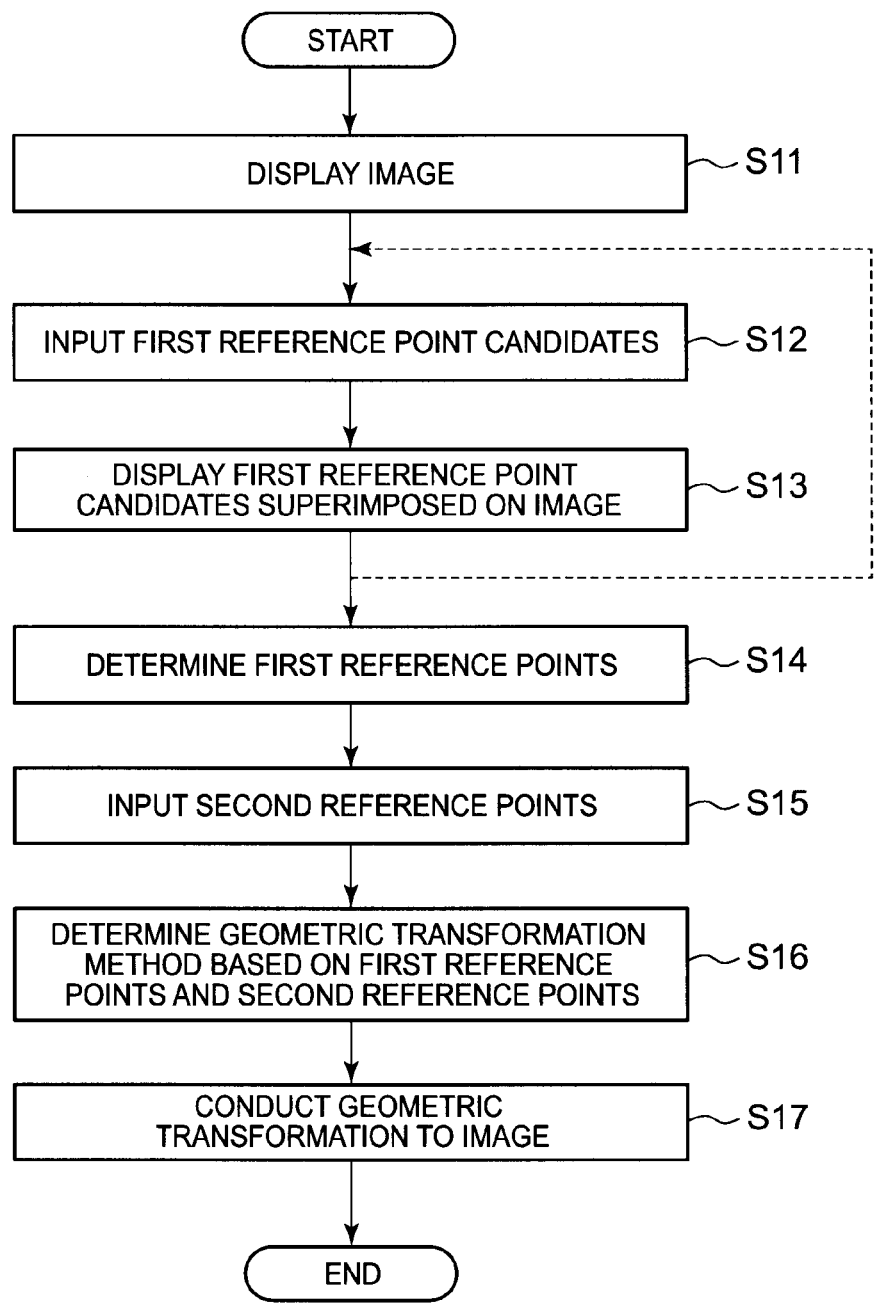
[FIG. 2] It depicts a flow chart showing an example of the operation of the first exemplary embodiment.

Next, the operation of this exemplary embodiment will be described with reference to FIG. 2. FIG. 2 is a flow chart showing an example of the operation of the image processing device of this exemplary embodiment. In the example shown in FIG. 2, the image display means 12 first displays a transformation target image (step S11). In this step, the transformation target image is displayed in order to receive the input of the first reference point candidates. For example, when a plurality of images containing the object of interest are inputted as the transformation target images, the image display means 12 displays an operation screen that includes a drawing area (area in which dots, marks, lines connecting the dots/marks, etc. can be inputted by mouse operation) with a background drawn by use of a transformation target image selected from the inputted transformation target images. The image display means 12 may switch the displayed transformation target image successively, or as needed according to a user operation.

Subsequently, the first reference point receiving means 11 inputs the first reference point candidates for the currently displayed transformation target image according to a user operation (step S12). In this step, the first reference point receiving means 11 inputs information on the first reference point candidates in regard to one transformation target image. The first reference point receiving means 11 makes the user input the first reference point candidates by displaying a message (prompting the user to input the first reference point candidates) on the operation screen displaying the transformation target image or by first displaying two points (preset as the initial values of the first reference point candidates) on the transformation target image and then displaying a message prompting the user to adjust the points, for example.

In response to the input of the information on the first reference point candidates, the image display means 12 displays the first reference point candidates according to the inputted information while superposing them on the transformation target image (step S13). In other words, the image display means 12 displays a composite image of the transformation target image and the first reference point candidates. In the step S13, the image display means 12 may use a user interface that draws the first reference point candidates according to information inputted inside the drawing area of the operation screen.

Subsequently, the first reference point receiving means 11 determines the first reference points according to a user operation (step S14). For example, the first reference point receiving means 11 determines the currently displayed first reference point candidates as the first reference points when the first reference point determination signal inputted by the user operation is received. Alternatively, the first reference point receiving means 11 may also determine first reference point candidates in a selected state at that time as the first reference points. The first reference point receiving means 11 may be equipped with, for example, a user interface that makes the user input the first reference point determination signal after letting the user select some of the currently displayed first reference point candidates in cases where an excessive number of first reference point candidates (larger than the essential (necessary) number of reference points) have been displayed.

The first reference point determination signal may be inputted by the depressing of a determination button by the user, for example. The user may check the positions, etc. of the first reference point candidates displayed in the step S13 and depress the determination button when he/she judges that the displayed first reference point candidates satisfy conditions for the reference points. The user may also make positional adjustment, deletion, addition, etc. of the first reference point candidates when necessary. For example, there can be cases where the number of the first reference point candidates targeted by the first reference point determination signal (e.g., currently displayed first reference point candidates or first reference point candidates in the selected state) when the first reference point determination signal is received by the first reference point receiving means 11 is less than the essential number of reference points. In such cases, the first reference point receiving means 11 may inform the user of the situation and prompt the user to perform the selecting operation again or input information on new first reference point candidates. The first reference point receiving means 11 determines two or more first reference points for each transformation target image according to such user operations. Incidentally, each point determined as a first reference point is assigned identification information for specifying the association (correspondence) with the second reference point. The identification information can be any type of information as long as it can retain the relationship between one point as a first reference point and a corresponding one point as a second reference point. The identification information can be a subscript of an arrangement, for example.

Subsequently, the second reference point receiving means 13 inputs the second reference points (step S15). The second reference point receiving means 13 may input the second reference points by, for example, loading information on previously set second reference points from storage means or the like, or by receiving information on the second reference points from the user similarly to the first reference point receiving means 11. In the case where the second reference points are set to be common to all the transformation target images, the second reference point receiving means 13 may input information on second reference points common to all the transformation target images, for example.

When the necessary numbers of first reference points and second reference points (equal to the necessary number of corresponding points) have been determined for each transformation target image, the geometric transformation method determining means 14 determines the geometric transformation method to be conducted to each transformation target image based on the first reference points and the second reference points (step S16). For example, the geometric transformation method determining means 14 generates the transformation equations of the geometric transformation to be conducted to each transformation target image by determining the parameters of the transformation equations based on the numbers of the reference points and in-image positions (image coordinates) of the reference points.

Finally, the geometric transformation means 15 conducts the geometric transformation to each transformation target image by using the transformation method (transformation equations) determined in the step S16, and outputs the image generated by the geometric transformation as the transformed image (step S17). Incidentally, while each step in the above explanation was described as processing for all the transformation target images, the flow chart can also be executed as a series of steps for one transformation target image. In such cases, the above steps (steps S11-S17) may be repeated for the number of the transformation target images.

Figure 3:
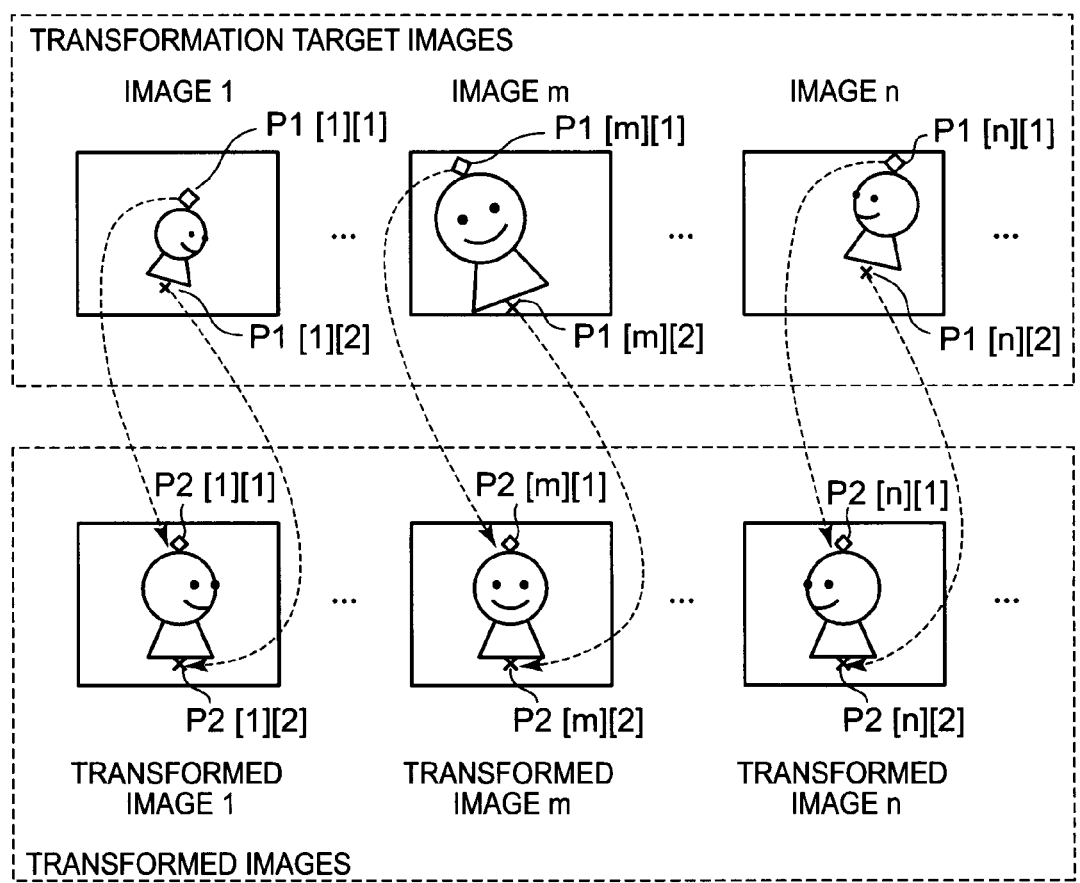
[FIG. 3] It depicts an explanatory drawing showing the outline of a transformation process conducted in the first exemplary embodiment.

In the following, this exemplary embodiment will be explained in more detail by using specific examples. FIG. 3 is an explanatory drawing showing the outline of the geometric transformation conducted to the transformation target images in this exemplary embodiment. In the example of FIG. 3, {IMAGE 1, . . . , IMAGE m, . . . , IMAGE n, . . . } have been inputted as the transformation target images. The first reference points have been set as image coordinates of two points forming a line segment orthogonal to the ground and passing through the barycenter of the object of interest (coordinates with respect to the axes of the transformation target image) as an example of a line segment serving as the camera rotation axis in the three-dimensional space. Incidentally, the two points are the upper end and the lower end of the object of interest.

In FIG. 3, the ◊ mark and the x mark put on each one of the transformation target images in the upper row (images 1, m, n) represent the first reference points which have been set for the transformation target image (◊ mark: upper end, x mark: lower end). The point represented by the ◊ mark will be referred to as a first point (upper reference point) of the first reference points, and the point represented by the x mark will be referred to as a second point (lower reference point) of the first reference points. Meanwhile, the ◊ mark and the x mark put on each one of the transformed images 1, m and n in the lower row represent the second reference points as the results (destinations) of the transformation of the first reference points set for the transformation target image 1, m, n.

In FIG. 3, the first reference points are expressed as "P1" and the second reference points are expressed as "P2". The subsequent two subscripts [A][B] represent an image index ([A]) and a reference point index ([B]), respectively. In this example, each index is expressed by using a number starting from 1. For example, P1[1][1] represents image coordinates as the information on the first point (upper reference point) of the first reference points in the first transformation target image (image 1), and P1[1][2] represents image coordinates as the information on the second point (lower reference point) of the first reference points in the image 1. Similarly, P2[n][1] represents image coordinates as the information on the first point (upper reference point) of the second reference points in the transformed image n generated from the n-th transformation target image (image n), and P2[n][2] represents image coordinates as the information on the second point (lower reference point) of the second reference points in the transformed image n generated from the image n. In this example, the second reference points are common to all the images.

In this example, the image display means 12 first displays an image containing the object of interest (inputted as a transformation target image) by using an image display device (monitor, projector, etc.) of the image display means 12. In this step, the image display means 12 displays an operation screen including the transformation target image and an input interface (tool bar, cursor, etc.). The user, viewing the transformation target image displayed by the image display means 12, inputs the first reference point candidates by using the mouse, keyboard or the like. In this step, the user inputs the information on the first reference point candidates (image coordinates of the ◇ mark and the x mark) by specifying the positions of the two points forming the line segment orthogonal to the ground and passing through the barycenter of the object of interest by performing the mouse clicking operation or the like.

The first reference point receiving means 11 receives the information on the first reference point candidates (image coordinates of the ◇ mark and the x mark) for the currently displayed image 1, for example, as an input from the user. In this case, the image display means 12 lets the user check the positions of the first reference point candidates in the transformation target image by superimposing the inputted first reference point candidates on the transformation target image, for example. The user checks the positions, etc. of the first reference point candidates with respect to the displayed transformation target image, and inputs the first reference point determination signal when he/she has judged that the currently displayed first reference point candidates may be determined as the first reference points. When not satisfied with the positional relationship, the user may switch the validity/invalidity of the first reference point candidates and adjust the positions of the first reference point candidates by operating the input interface (tool bar, cursor, etc.) by using the mouse, keyboard or the like.

In response to the input of the first reference point determination signal, the first reference point receiving means 11 determines the first reference point candidates as the first reference points and outputs the determined first reference points to the geometric transformation method determining means 14.

Subsequently, the second reference point receiving means 13 receives the second reference points as the results (destinations) of the transformation of the first reference points. In this example, the user inputs the second reference point candidates by using the mouse, keyboard or the like, and inputs the second reference point determination signal when satisfied. The second reference point receiving means 13 receives the inputted second reference point candidates as the second reference points when the second reference point determination signal is inputted by the user. For example, when the object of interest has been shot in an inclined state in the transformation target image, geometric transformation for making the object of interest perpendicular on the screen becomes possible if the user makes the input so as to equalize the horizontal coordinates of the first reference point and the second reference point. Assuming that the width and the height of the transformed image are w pixels and h pixels, respectively, the object of interest after the geometric transformation can be placed in the transformed image to be at the center in the horizontal direction and to have an 80% length of the transformed image in the vertical direction by setting the image coordinates of the first point (upper reference point) of the second reference points at (0.5 w, 0.9 h) and setting the image coordinates of the second point (lower reference point) of the second reference points at (0.5 w, 0.1 h). It is also possible to previously set the above settings and load such preset information on the second reference points from storage means (e.g., external storage medium). Upon receiving the second reference points, the second reference point receiving means 13 outputs the received second reference points to the geometric transformation method determining means 14.

Subsequently, the geometric transformation method determining means 14 determines the geometric transformation method based on the first reference points and the second reference points, and outputs information on the determined geometric transformation method to the geometric transformation means 15. In this example, similarity transformation is used as the geometric transformation method since two points have been selected for the first reference points and for the second reference points. The similarity transformation is defined by the following equations (1):

$$u_i' = au_i - bv_i + c$$

$$v_i' = bu_i + av_i + d \qquad \text{Equation (1)}$$

In the above equations (1), $(u_i, v_i)$ represent the image coordinates of the first or second point of the first reference points in the transformation target image as the processing target, and $(u_i', v_i')$ represent the image coordinates of the first or second point of the second reference points in the transformed image generated from the transformation target image as the processing target. (a, b, c, d) represent similarity transformation parameters. The subscript i represents the first point (upper reference point) when i=1 or the second point (lower reference point) when i=2. By transforming the equations (1), the following equation (2) is obtained:

$$\sum_{i=1}^{2} \left\| \begin{pmatrix} a & -b & c \\ b & a & d \\ 0 & 0 & 1 \end{pmatrix} \begin{pmatrix} u_i \\ v_i \\ 1 \end{pmatrix} \times \begin{pmatrix} u_i' \\ v_i' \\ 1 \end{pmatrix} \right\|^2 = \qquad \text{Equation (2)}$$

$$\left\| \begin{pmatrix} u_1 & -v_1 & 1 & 0 & -u_1' \\ -v_1 & -u_1 & 0 & -1 & v_1' \\ u_2 & -v_2 & 1 & 0 & -u_2' \\ -v_2 & -u_2 & 0 & -1 & v_2' \end{pmatrix} \begin{pmatrix} a \\ b \\ c \\ d \\ 1 \end{pmatrix} \right\|^2$$

The similarity transformation parameters (a, b, c, d) to be determined are a vector that minimizes the value of the equation (2). The similarity transformation parameters (a, b, c, d) can be calculated by scaling the fifth element of the eigenvector corresponding to the absolute minimum eigenvalue of the 4×5 matrix on the right side of the equation (2) to 1.

The geometric transformation means 15 conducts the geometric transformation to the transformation target image as the processing target by using the similarity transformation parameters (a, b, c, d) determined as above and outputs the transformed image. In this example, the image as the result of the similarity transformation can be obtained by substituting the determined similarity transformation parameters into the equations (1) and executing the similarity transformation to all pixels of the transformation target image. Since the image coordinates after the transformation are generally non-integral values, the geometric transformation means 15 compensates for the pixel loss by performing interpolation. Various interpolation methods such as the nearest neighbor method (using the pixel values of the observation point closest to the interpolation point as the pixel values of the interpolation point) and the bilinear method (using linear interpolation values of the pixel values of four observation points around the interpolation point as the pixel values of the interpolation point) can be used. Thereafter, the geometric transformation means 15 outputs the image after undergoing the similarity transformation as the transformed image.

As described above, according to this exemplary embodiment, a three-dimensional image can be generated by use of a single camera only by performing a simple user operation, without the need of using other equipment such as a turntable and an acceleration sensor for detecting the camera position/posture information.

The above effect is achieved because the size and the inclination of the object of interest in the plurality of images can be uniformized by making the user specify the image coordinates constituting the camera rotation axis for each of the images containing the object of interest and by conducting the geometric transformation so that the specified image coordinates coincide with each other. The above effect is achieved also because the first reference points used for determining the geometric transformation method are determined from a plurality of images containing the object of interest. In short, the above effect is achieved because equipment other than the camera is made unnecessary at the time of shooting by the calculation of the geometric transformation parameters by use of image information only.

Incidentally, while the similarity transformation was conducted in the above explanation as a specific example, not only the similarity transformation but also arbitrary types of geometric transformations such as the affine transformation and the projective transformation are selectable. In such cases, each of the first and second reference point receiving means 11 and 13 may be configured to receive the image coordinates of two or more points and output the received image coordinates to the geometric transformation method determining means 14. The image processing device is capable of dealing with the change in the geometric transformation method by modifying the calculation method of the geometric transformation method determining means 14 according to the number of parameters and the transformation equations of the selected geometric transformation.

When the affine transformation is selected, for example, the necessary number of corresponding points (the number of reference points) is three at least. Thus, each of the first and second reference point receiving means 11 and 13 may be configured to receive the image coordinates of three or more points and output the received image coordinates to the geometric transformation method determining means 14. Based on the outputted information on the first reference points and the second reference points, the geometric transformation method determining means 14 may determine transformation parameters (a, b, c, d, e, f) from the following equations (3):

$$u_i' = au_i + bv_i + c$$

$$v_i' = du_i + ev_i + f \qquad \text{Equation (3)}$$

When the projective transformation is selected, for example, the necessary number of corresponding points is four at least. Thus, each of the first and second reference point receiving means 11 and 13 may be configured to receive the image coordinates of four or more points and output the received image coordinates to the geometric transformation method determining means 14. Based on the outputted information on the first reference points and the second reference points, the geometric transformation method determining means 14 may determine transformation parameters (a1-a8) from the following equations (4):

$$u_i' = (a1 \times u_i + a2 \times v_i + a3)/(a7 \times u_i + a8 \times v_i + 1)$$

$$v_i' = (a4 \times u_i + a5 \times v_i + a6)/(a7 \times u_i + a8 \times v_i + 1) \qquad \text{Equation (4)}$$

<Second Exemplary Embodiment>

Figure 4:
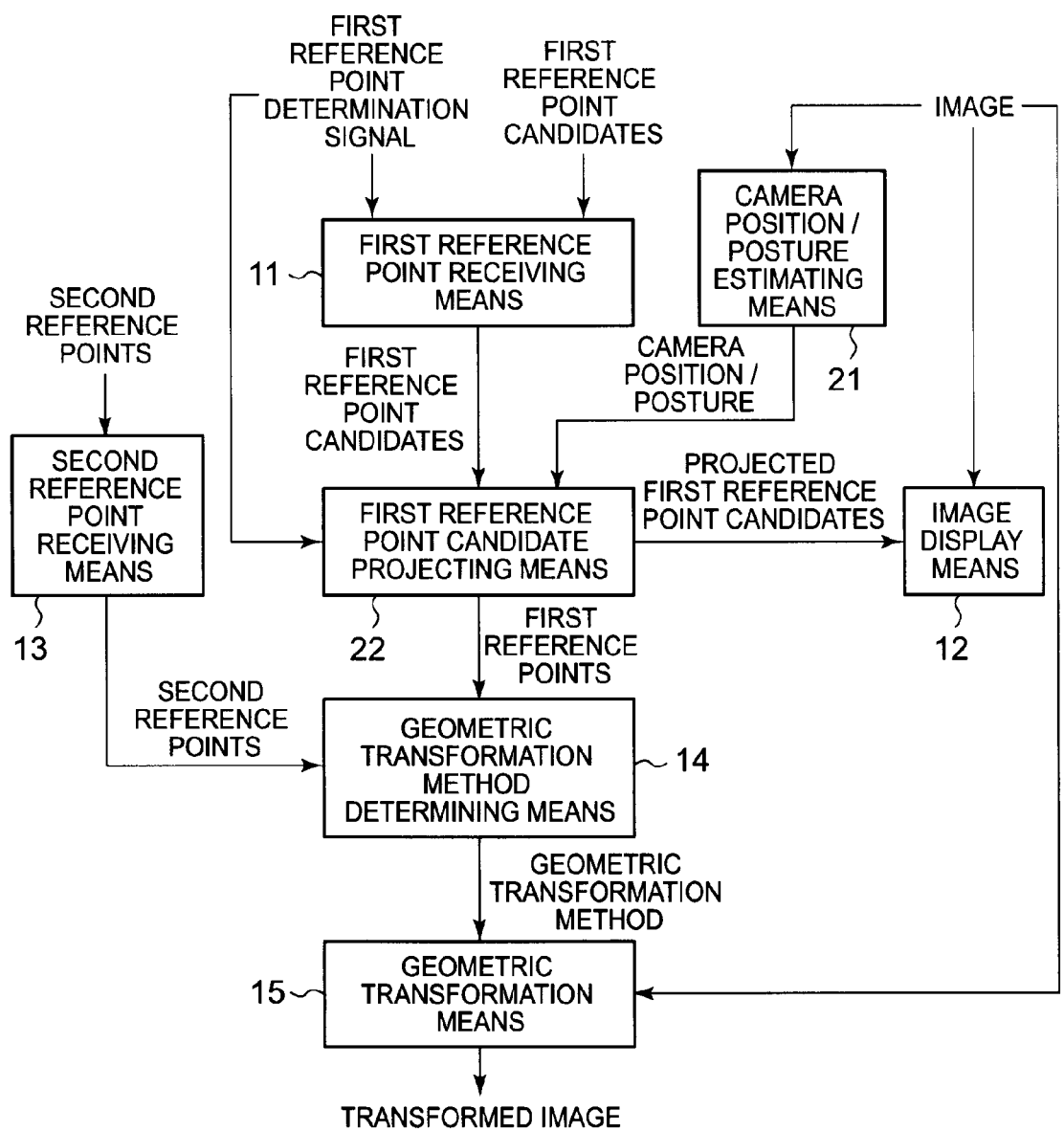
[FIG. 4] It depicts a block diagram showing an example of the configuration of a second exemplary embodiment.

Next, a second exemplary embodiment of the present invention will be described with reference to figures. FIG. 4 is a block diagram showing an example of the configuration of an image processing device in accordance with this exemplary embodiment. The image processing device shown in FIG. 4 differs from the first exemplary embodiment shown in FIG. 1 in that the image processing device further comprises camera position/posture estimating means 21 and first reference point candidate projecting means 22.

In this exemplary embodiment, the image processing device makes the user input multiple sets of three-dimensional coordinates constituting a candidate for the camera rotation axis in each image containing the object of interest (transformation target image) as the first reference point candidates.

For each transformation target image, the camera position/posture estimating means 21 estimates the position and the posture of the camera that shot the transformation target image and outputs the estimated camera position/posture to the first reference point candidate projecting means 22. For the estimation of the position and the posture of the camera, various methods, such as a method using preset markers and a method using the correspondence between already-known three-dimensional coordinates and image coordinates at which the already-known three-dimensional coordinates have been observed, can be employed.

The first reference point candidate projecting means 22 projects the first reference point candidates (or line segments connecting the first reference point candidates) onto the transformation target image based on the inputted information on the first reference point candidates and the camera position/posture regarding the transformation target image. Thereafter, the first reference point candidate projecting means 22 outputs the result of the projection to the image display means 12 as projected first reference point candidates. Incidentally, the projected first reference point candidates can also be considered as first reference point candidates represented by coordinate information in the transformation target image.

In this exemplary embodiment, once the first reference points are determined for one transformation target image, the projected first reference point candidates in the other transformation target images (generated by the first reference point candidate projecting means 22) are determined as the first reference points in the other transformation target image based on the information on the first reference points determined for one transformation target image.

Incidentally, besides directly outputting the projected first reference point candidates (generated by calculation) as the first reference points in regard to each of the other transformation target images, it is also possible to once display the projected first reference point candidates (generated by calculation) and thereby let the user judge whether the projected first reference point candidates are appropriate or not or individually adjust the projected first reference point candidates. The operation for individually adjusting the projected first reference point candidates is equivalent to the operation described in the first exemplary embodiment. Whether the adjustment to the currently displayed projected first reference point candidates should be incorporated into the other transformation target images or not can be specified by the user or judged based on the switching of the operation screen (to a page for individual adjustment, etc.). The first reference point candidate projecting means 22 outputs information on the first reference points determined in each transformation target image to the geometric transformation method determining means 14 as needed.

The image processing device may also be configured so that the first reference point candidate projecting means 22 outputs information on the projected first reference point candidates of each transformation target image to the first reference point receiving means 11 and the first reference point receiving means 11 outputs the first reference points in each transformation target image based on the information from the first reference point candidate projecting means 22.

In this exemplary embodiment, the image display means 12 displays an image generated by superimposing the projected first reference point candidates on the transformation target image.

The camera position/posture estimating means 21 and the first reference point candidate projecting means 22 are implemented by, for example, hardware designed to perform particular calculation processes, etc. and a CPU operating according to a program.

Figure 5:
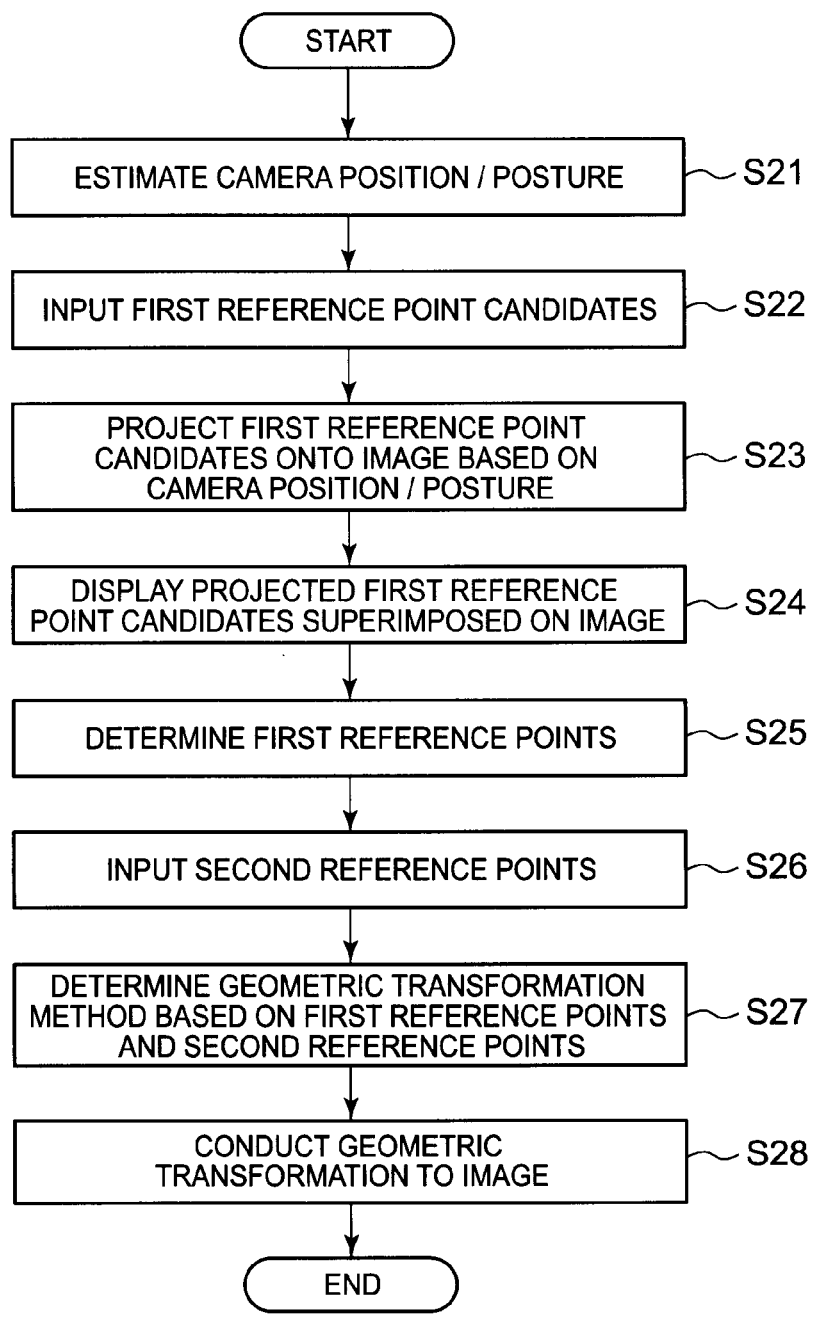
[FIG. 5] It depicts is a flow chart showing an example of the operation of the second exemplary embodiment.

Next, the operation of this exemplary embodiment will be described with reference to FIG. 5. FIG. 5 is a flow chart showing an example of the operation of the image processing device of this exemplary embodiment. In the example shown in FIG. 5, the camera position/posture estimating means 21 first estimates the camera position/posture regarding the transformation target image (step S21). In this step, the camera position/posture estimating means 21 estimates the position and the posture of the camera for each inputted transformation target image. For example, the camera position/posture estimating means 21 may estimate three-dimensional coordinates (X, Y, Z) in the world coordinate system as the position of the camera and a 3×3 matrix representing a rotation with respect to the world coordinate system as the posture of the camera by use of the captured image information.

Subsequently, the first reference point receiving means 11 inputs multiple sets of three-dimensional coordinates constituting a candidate for the camera rotation axis in the transformation target image, as information on the first reference point candidates in regard to at least one image (step S22). For example, the first reference point receiving means 11 may make the user input the information on the first reference point candidates by displaying an operation screen including the same number of input fields (for inputting the information on a first reference point candidate) as the corresponding points necessary for the employed geometric transformation equations. Alternatively, the first reference point receiving means 11 may also acquire the values of the first reference point candidates by loading in preset initial values. The inputted information on the first reference point candidates is outputted to the first reference point candidate projecting means 22.

Upon the input of the information on the first reference point candidates in regard to a transformation target image, the first reference point candidate projecting means 22 projects the inputted first reference point candidates onto the image based on the camera position/posture (step S23). Subsequently, the image display means 12 displays the projected first reference point candidates while superimposing them on the image (step S24). For example, the image display means 12 displays an operation screen for adjusting the positions, etc. of the projected first reference point candidates on the transformation target image. The image display means 12 may also display an operation screen including the rotation axis (line segments) projected onto the image (generated by connecting the projected first reference point candidates).

The user checks the positions, etc. of the projected first reference point candidates (displayed in the step S24) in the transformation target image and inputs the first reference point determination signal when satisfied. The user also makes adjustment, such as modification of the positions of the projected first reference point candidates, so that the lengths, inclination angles and positions of the line segments connecting the projected first reference point candidates become appropriate for the camera rotation axis. In this case where the user has made the adjustment, the information on the first reference point candidates is modified. The user may also directly modify the values (three-dimensional coordinates) which have been inputted as the information on the first reference point candidates. The first reference point determination signal is inputted to the first reference point receiving means 11 and the first reference point candidate projecting means 22.

Upon receiving the first reference point determination signal, the first reference point receiving means 11 or the first reference point candidate projecting means 22 determines the projected first reference point candidates as the first reference points (step S25). For example, the first reference point receiving means 11 or the first reference point candidate projecting means 22 may determine the projected first reference point candidates currently displayed as the target of the first reference point determination signal (more specifically, the projected first reference point candidates forming the currently displayed line segments) as the first reference points. In this exemplary embodiment, the determination of the first reference points from the projected first reference point candidates in regard to one transformation target image is equivalent to the determination of the three-dimensional coordinates as the projection source of the projected first reference point candidates. Therefore, the first reference points can be calculated also for the other transformation target images based on the three-dimensional coordinates and the camera position/posture regarding each image.

Subsequently, the second reference point receiving means 13 inputs the second reference points (step S26). Then, the geometric transformation method determining means 14 determines the geometric transformation method based on the first reference points and the second reference points (step S27). Finally, the geometric transformation means 15 conducts the geometric transformation to each image and outputs each transformed image (step S28). The operation in the steps S26-S28 may be performed in the same way as the steps S15-S17 in the first exemplary embodiment.

Incidentally, while each step in the above explanation was assumed as processing for all the transformation target images, each step can also be conducted to one transformation target image at a time. In such cases, the above steps (steps S21-S28) may be repeated for the number of the transformation target images. The steps S22-S24 for other transformation target images can be left out when the steps S22-S24 have already been conducted for one of the transformation target images. This is because the first reference points in each of the other transformation target images can be determined in the step S25 without the need of making the user repeatedly input the first reference point candidates. More specifically, this is because the first reference points in each image are uniquely determined based on the camera position/posture regarding each image once the first reference points are determined for one transformation target image.

In the following, this exemplary embodiment will be explained in more detail by using specific examples. First, for each transformation target image, the camera position/posture estimating means 21 estimates the position and the posture of the camera that shot the transformation target image. For example, the camera position/posture estimating means 21 may estimate the position t and the posture R of the camera based on the appearance of markers (previously registered by printing on paper, for example) in the image. Alternatively, the camera position/posture estimating means 21 may estimate the position t and the posture R of the camera based on combinations (correspondence) between multiple sets of already-known three-dimensional coordinates and image coordinates at which the multiple sets of already-known three-dimensional coordinates have been observed. The position t of the camera is determined as, for example, three-dimensional coordinates (X, Y, Z) in the world coordinate system. The camera position/posture estimating means 21 determines the posture R of the camera as, for example, a 3×3 matrix representing a rotation with respect to the world coordinate system. By using the roll, pitch and yaw, the posture R of the camera can be represented as the following expression (5): By using quaternions, the posture R of the camera can be represented as the following expression (6):

$$R = \begin{bmatrix} \cos\phi & -\sin\phi & 0 \\ \sin\phi & \cos\phi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\psi & -\sin\psi \\ 0 & \sin\psi & \cos\psi \end{bmatrix}$$

$$= \begin{bmatrix} \cos\phi\cos\theta & \cos\phi\sin\theta\sin\psi - \sin\phi\cos\psi & \cos\phi\sin\theta\cos\psi + \sin\phi\sin\psi \\ \sin\phi\cos\theta & \sin\phi\sin\theta\sin\psi + \cos\phi\cos\psi & \sin\phi\sin\theta\cos\psi - \cos\phi\sin\psi \\ -\sin\theta & \cos\theta\sin\psi & \cos\theta\cos\psi \end{bmatrix}$$

Equation (5)

In the expression (5), $\phi$ represents rotation around the Z-axis (roll), $\theta$ represents rotation around a new Y-axis (pitch), and $\psi$ represents rotation around a new X-axis (yaw).

$$R = \begin{bmatrix} q_0^2 + q_1^2 - q_2^2 - q_3^2 & 2(q_1 q_2 - q_0 q_3) & 2(q_1 q_3 + q_0 q_2) \\ 2(q_1 q_2 + q_0 q_3) & q_0^2 - q_1^2 + q_2^2 - q_3^2 & 2(q_2 q_3 - q_0 q_1) \\ 2(q_1 q_3 - q_0 q_2) & 2(q_2 q_3 + q_0 q_1) & q_0^2 - q_1^2 - q_2^2 + q_3^2 \end{bmatrix}$$

Equation (6)

Subsequently, the first reference point receiving means 11 receives the first reference point candidates as an input from the user and outputs the received first reference point candidates to the first reference point candidate projecting means 22. The user viewing the image displayed on the image display means 12 inputs the first reference point candidates by using the mouse, keyboard or the like. For example, the user may input three-dimensional coordinates (0, 0, 0) as the initial value of the first point (upper reference point) of the first reference point candidates and three-dimensional coordinates (0, 1, 0) as the initial value of the second point (lower reference point) of the first reference point candidates.

The first reference point candidate projecting means 22 projects the inputted first reference point candidates onto the transformation target image based on the inputted three-dimensional coordinates of the first reference point candidates and the camera position/posture estimates regarding the transformation target image. Incidentally, the initial values of the first reference point candidates may also be set by using preset values instead of using values inputted by the user.

Let "t" represent the position of the camera, "R" represent the posture of the camera, "$X_1$" represent the first three-dimensional coordinates of the first reference point candidates, and "$X_2$" represent the second three-dimensional coordinates of the first reference point candidates, the projected first reference point candidates can be determined from the following expression (7):

$$\begin{pmatrix} u_i \\ v_i \\ 1 \end{pmatrix} \cong K[ R^T \quad -R^T t ] X_i$$

Equation (7)

In the expression (7), the symbol to the left of $K[R^T-R^T t]X_i$ indicates that the right side of the expression is equal to the left side multiplied by a constant number.

The superscript "$T$" represents the transposition of a matrix. "K" represents an internal parameter of the camera. The internal parameter K may be previously determined by using a method for estimating a camera internal parameter by employing projective transformation (e.g., technique by Zhang et al.), for example. The internal parameter K may also be determined simultaneously with the shooting by using a method for estimating a camera internal parameter from three or more images (e.g., technique by Pollefeys et al.), for example. In the case where the internal parameter of the camera is estimated, the camera position/posture estimating means 21 also outputs the internal parameter of the camera to the first reference point candidate projecting means 22 in addition to the camera position/posture.

The user compares the projected first reference point candidates displayed by the image display means 12 with the object of interest, adjusts the first reference point candidates so that the lengths, inclination angles and positions of the line segments connecting the projected first reference point candidates become appropriate for the camera rotation axis, and inputs the first reference point determination signal when satisfied. In this exemplary embodiment, the first reference point receiving means 11 performs nothing in response to the input of the first reference point determination signal.

In response to the input of the first reference point determination signal by the user, the first reference point candidate projecting means 22 determines the currently displayed projected first reference point candidates as the first reference points in the transformation target image and outputs the determined first reference points to the geometric transformation method determining means 14. For each of the other transformation target images, the first reference point candidate projecting means 22 determines the first reference points in the transformation target image based on the information on the first reference point candidates in the projection source at this time and the camera position/posture regarding each image. The operation after this step is equivalent to that in the first exemplary embodiment.

As described above, in this exemplary embodiment, the user does not have to input the information on the first reference point candidates for each image or determine the first reference point candidates as the first reference points for each image. This is because the first reference points in each image are uniquely determined based on the camera position/posture regarding each image once the first reference points are determined for one image.

<Third Exemplary Embodiment>

Figure 6:
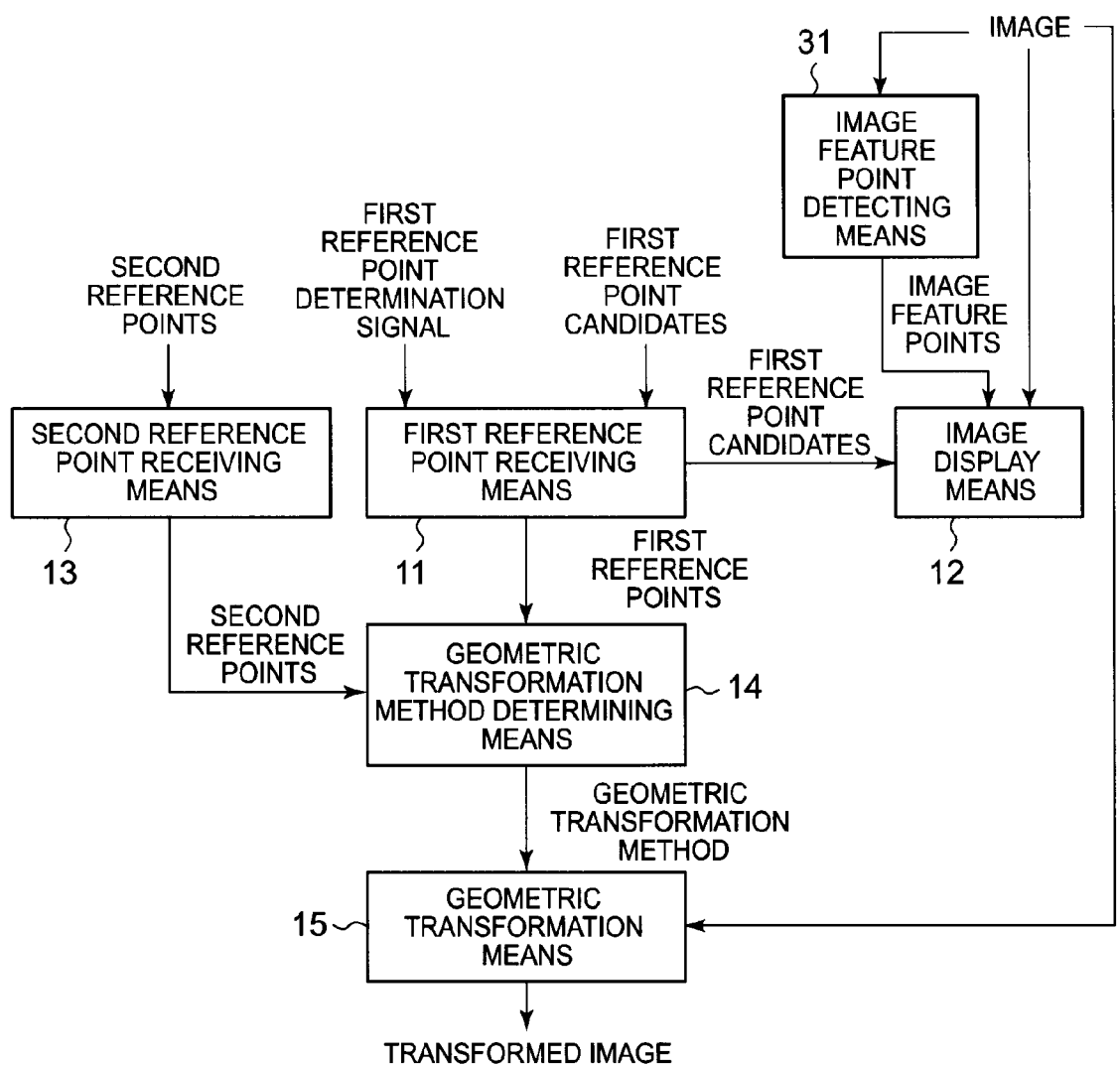
[FIG. 6] It depicts a block diagram showing an example of the configuration of a third exemplary embodiment.

Next, a third exemplary embodiment of the present invention will be described with reference to figures. FIG. 6 is a block diagram showing an example of the configuration of an image processing device in accordance with the third exemplary embodiment. The image processing device shown in FIG. 6 differs from the first exemplary embodiment shown in FIG. 1 in that the image processing device further comprises image feature point detecting means 31.

In this exemplary embodiment, the first reference point candidates are set as multiple sets of image coordinates constituting a candidate for the camera rotation axis in each of the images containing the object of interest (transformation target images). However, the image processing device in this exemplary embodiment does not make the user input the first reference point candidates (multiple sets of image coordinates) for each image. When there is an image feature point common to a plurality of images, the first reference points in each image are determined by use of the common image feature point.

The image feature point detecting means 31 detects image feature points in regard to each of the transformation target images. The image feature point detecting means 31 also executes matching (comparison) among the transformation target images in regard to the detected image feature points and thereby detects image feature points that are observed in a plurality of images as image coordinates as the result of projection of the same three-dimensional coordinates. Then, the image feature point detecting means 31 makes the image display means 12 display the detected image feature points. For the detection of the image feature points, it is possible to use the Harris corner detection method (judging whether each point corresponds to a corner or not based on the surrounding gradients of the pixel value), for example, and detect (regard) points judged as corners as the image feature points. The image feature point detecting means 31 may detect the image feature points by employing various methods such as SIFT. SIFT is an image feature point detecting method and a feature quantity describing method having high robustness against illumination fluctuation, rotation and scaling (magnification and reduction). The matching in regard to the image feature points can be executed by employing various methods such as a method using the normalized cross-correlation of pixel values and the KLT method. In the method using the normalized cross-correlation, the comparison is made by calculating correlation values for images each acquired by subtraction of the average pixel value and division by the standard deviation in a search area. In the KLT method, the search for the corresponding points is conducted by assuming that the luminance gradient is constant in an infinitesimal time period.

In this exemplary embodiment, the image display means 12 displays an image generated by superimposing the image feature points on the transformation target image. The image display means 12 also displays an image generated by superimposing the first reference point candidates (selected from the image feature points) on the transformation target image.

The image feature point detecting means 31 is implemented by, for example, hardware designed to perform particular calculation processes, etc. and a CPU operating according to a program.

Figure 7:
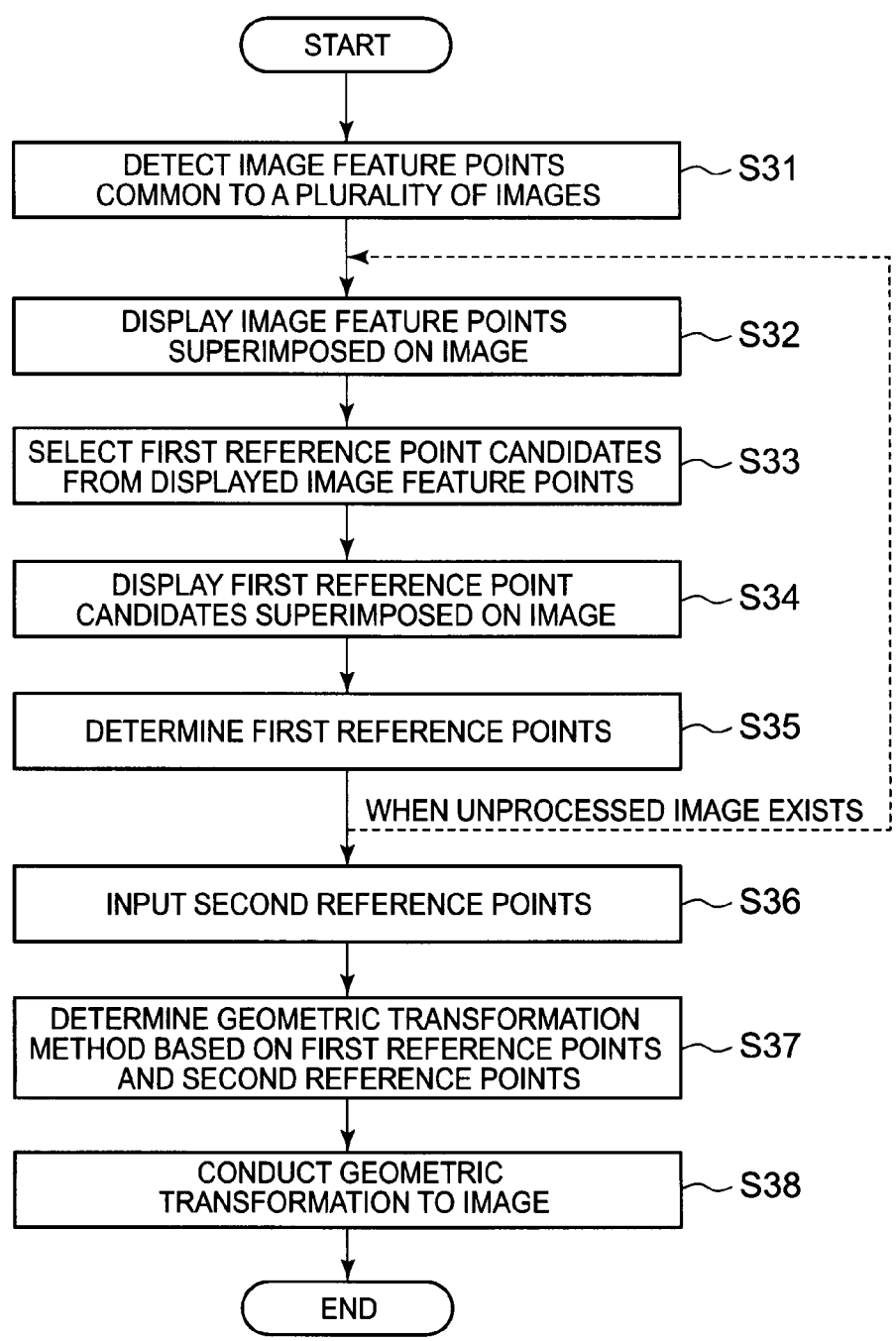
[FIG. 7] It depicts a flow chart showing an example of the operation of the third exemplary embodiment.

Next, the operation of this exemplary embodiment will be described below. FIG. 7 is a flow chart showing an example of the operation of the image processing device of this exemplary embodiment. In the example shown in FIG. 7, for each transformation target image, the image feature point detecting means 31 detects image feature points that are common to a plurality of images including the transformation target image (step S31).

Subsequently, for each image, the image display means 12 displays the image feature points detected from the image while superposing them on the image (step S32). At this point, the user compares the image displayed by the image display means 12 with the image feature points of the image and performs an operation for selecting two or more points in the image (to be specified as the first reference point candidates) from the displayed image feature points (step S33). The first reference point receiving means 11 acquires information on the image feature points selected as the first reference point candidates based on the user operation. In response to the user's selecting operation, the image display means 12 displays the first reference point candidates in each image while superimposing them on the image (step S34). In this step, based on the result of the selection of the first reference point candidates (from the image feature points) in an image (first image), also in other images having an image feature point that is considered to be identical with one of the image feature points selected as the first reference point candidates in the first image, the image feature point is considered to have been selected as a first reference point candidate. The image display means 12 may display the first reference point candidates in regard to each image. In other words, when an image feature point selected as a first reference point candidate is an image feature point common to a plurality of images, the first reference point receiving means 11 automatically selects the image feature point as a first reference point candidate also in other images having the image feature point.

The user may determine the displayed first reference point candidates as the first reference points by inputting the first reference point determination signal when the displayed first reference point candidates are satisfactory in each image (step S35). The method of determining the first reference points in response to the first reference point determination signal is equivalent to that in the first exemplary embodiment. For example, upon receiving the first reference point determination signal inputted by the user operation, the first reference point receiving means 11 may determine the currently displayed first reference point candidates (i.e., image feature points currently displayed as the first reference point candidates due to the selection by the user) as the first reference points.

If there is an unprocessed image at this point, the first reference point receiving means 11 may repeat the steps S32-S35 for the unprocessed image.

Subsequently, the second reference point receiving means 13 inputs the second reference points (step S36). Then, the geometric transformation method determining means 14 determines the geometric transformation method based on the first reference points and the second reference points (step S37). Finally, the geometric transformation means 15 conducts the geometric transformation to each image and outputs each transformed image (step S38). The operation in the steps S36-S38 may be performed in the same way as the steps S15-S17 in the first exemplary embodiment.

In the following, this exemplary embodiment will be explained in more detail by using specific examples. First, the image feature point detecting means 31 executes the detection and the matching of the image feature points in each of the transformation target images and thereby detects image feature points having correspondence among a plurality of images. It is desirable in this step to detect image feature points that are common to all the images. When no such image feature points common to all the images are detected, the image feature point detecting means 31 detects image feature points that are common to images within a certain period in the successively shot images, for example.

It is assumed here that the number of image feature points common to all the images is n per image, the number of images is N, and n×N image feature points have been detected. The user compares the displayed image feature points and image, freely selects two points from the n points, and inputs the first reference point determination signal when satisfied. These two points have the matching (correspondence) among all the images. Therefore, once two points in one image are selected, the first reference points in all the images (2×N points) can be determined automatically.

In response to the input of the first reference point determination signal, the first reference point receiving means 11 successively outputs the determined 2×N first reference points to the geometric transformation method determining means 14 as each process for corresponding images is finished. The operation after this step is equivalent to that in the first exemplary embodiment.

Incidentally, when no image feature points common to all the images are detected, the above automatic determination of the first reference point candidates may be carried out within a range in which common image feature points have been detected.

In the detection of a common image feature point, the image feature point detecting means 31 may carry out the detection for all the images until the matching (correspondence) of the image feature point breaks, for example. Upon breakage of the matching of the image feature points, the image feature point detecting means 31 may repeatedly perform the image feature point matching operation again from the image until the matching breaks next and thereby detect a gap (discontinuous part) between the continuous intervals (in which the common image feature point continues) along with the detection of the common image feature point. For each interval in which a feature point continues, the first reference point receiving means 11 makes the geometric transformation method determining means 14 calculate the geometric transformation parameters from the common image feature point by using the first reference point candidate selected by the user. In contrast, for each gap between intervals, the first reference point receiving means 11 may make the user individually select the first reference point candidate (manual setting). The first reference point receiving means 11 may also make the geometric transformation method determining means 14 calculate the geometric transformation parameters by automatically selecting a point close to the first reference point candidate selected for the continuous interval. According to the latter method, after the selection is made once by the user, the first reference point can be determined automatically for all of the other transformation target images.

As described above, in this exemplary embodiment, it is unnecessary to determine the first reference points for each image. The estimation of the camera position/posture is also unnecessary. This is because image feature points common to a plurality of images are detected and the first reference points are determined by use of the detected image feature points.

Figure 8:
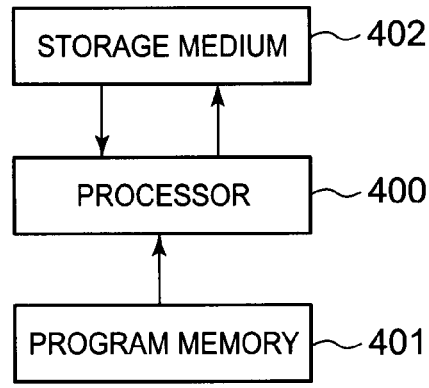
[FIG. 8] It depicts a block diagram showing a case where the present invention is applied to an information processing system.

Incidentally, each exemplary embodiment described above can be implemented not only by an image processing device implemented by hardware units, etc. corresponding to the aforementioned means but also by an information processing system like the one shown in FIG. 8. FIG. 8 is a block diagram showing a case where the image processing device in accordance with the present invention is implemented by an information processing system. The information processing system shown in FIG. 8 is a standard information processing system comprising a processor 400, a program memory 401 and a storage medium 402.

The storage medium 402 may either be a storage area made up of separate storage media or a storage area made up of a single storage medium. A RAM, a magnetic storage medium (e.g., hard disk), etc. can be used as the storage medium.

The program memory 401 prestores a program for causing the processor 400 to execute the processes of the first reference point receiving means 11, the second reference point receiving means 13, the geometric transformation method determining means 14 and the geometric transformation means 15 which have been described above. The processor 400 operates according to this program.

The processor 400 may be any type of processor (e.g., CPU) as long as it operates according to a program.

As above, the present invention can also be implemented by a computer program. Incidentally, it is unnecessary to operate every means that can be operated by a program (e.g., the first reference point receiving means 11, the second reference point receiving means 13, the geometric transformation method determining means 14, the geometric transformation means 15, etc.) by a program; part of these means may be formed with hardware. These means may also be implemented as separate units.

Figure 9:
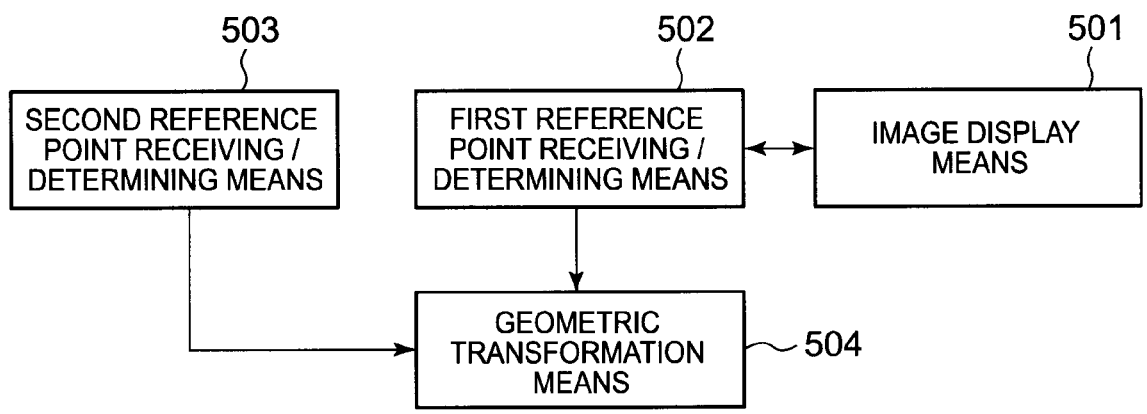
[FIG. 9] It depicts a block diagram showing the outline of the present invention.

Next, the outline of the present invention will be explained. FIG. 9 is a block diagram showing the outline of the present invention. The image processing device shown in FIG. 9 comprises image display means 501, first reference point receiving/determining means 502, second reference point receiving/determining means 503 and geometric transformation means 504.

The image display means 501 displays at least one transformation target image. In the above exemplary embodiments, the image display means 501 is represented as the image display means 12, for example.

The first reference point receiving/determining means 502 receives information on first reference point candidates (as candidates for first reference points serving for reference in input of geometric transformation) according to a user operation, receives according to a user operation a determination signal targeted at the first reference point candidates displayed on the transformation target image based on the information on the first reference point candidates, and determines the first reference points based on the information on the first reference point candidates targeted by the received determination signal.

For example, the first reference point receiving/determining means 502 may receive the information on the first reference point candidates (as candidates for the first reference points serving for reference in the input of the geometric transformation) according to a user operation, display the first reference point candidates on the transformation target image based on the received information on the first reference point candidates, receive according to a user operation a determination signal targeted at the first reference point candidates displayed on the transformation target image, and determine the first reference points based on the information on the first reference point candidates targeted by the received determination signal.

In the above exemplary embodiments, the first reference point receiving/determining means 502 is represented as the first reference point receiving means 11, for example. The first reference point receiving/determining means 502 may also be considered to further include other means necessary for the determination of the first reference points (e.g., the camera position/posture estimating means 21, the first reference point candidate projecting means 22 or the image feature point detecting means 31), for example. The first reference point receiving/determining means 502 may also be considered to further include control means for controlling those means.

The second reference point receiving/determining means 503 determines second reference points serving for reference in output of the geometric transformation by receiving information on the second reference points. In the above exemplary embodiments, the second reference point receiving/determining means 503 is represented as the second reference point receiving means 13, for example.

The geometric transformation means 504 outputs a transformed image by conducting the geometric transformation to the transformation target image based on the first reference points determined by the first reference point receiving/determining means 502 and the second reference points determined by the second reference point receiving/determining means 503. In the above exemplary embodiments, the geometric transformation means 504 is represented as the geometric transformation method determining means 14 and the geometric transformation means 15, for example.

While part or all of the above embodiments can also be described as the following Supplementary notes, the present invention is not to be restricted by the following description.

(Supplementary Note 1)

An image processing device which generates images for three-dimensional display of an object of interest from a plurality of transformation target images containing the object of interest, comprising:

image display means which displays at least one transformation target image;

first reference point receiving/determining means which receives information on first reference point candidates as candidates for first reference points serving for reference in input of geometric transformation according to a user operation, receives according to a user operation a determination signal targeted at the first reference point candidates displayed on the transformation target image based on the information on the first reference point candidates, and determines the first reference points based on the information on the first reference point candidates targeted by the received determination signal;

second reference point receiving/determining means which determines second reference points serving for reference in output of the geometric transformation by receiving information on the second reference points; and geometric transformation means which outputs a transformed image by conducting the geometric transformation to the transformation target image based on the first reference points determined by the first reference point receiving/determining means and the second reference points determined by the second reference point receiving/determining means.

(Supplementary Note 2)

The image processing device according to Supplementary note 1, comprising geometric transformation method determining means which calculates parameters of a prescribed geometric transformation equation for each transformation target image based on the first reference points and the second reference points, wherein the geometric transformation means conducts the geometric transformation to each transformation target image by using a geometric transformation equation according to the parameters calculated by the geometric transformation method determining means.

(Supplementary Note 3)

The image processing device according to Supplementary note 1 or 2, wherein:

the first reference point receiving/determining means receives the information on the first reference point candidates and the determination signal targeted at the first reference point candidates displayed on the transformation target image based on the information on the first reference point candidates in regard to each transformation target image, and the first reference point receiving/determining means receiving the determination signal determines the first reference point candidates targeted by the determination signal as the first reference points in the transformation target image.

(Supplementary Note 4)

The image processing device according to any one of Supplementary notes 1-3, comprising:

camera position/posture estimating means which estimates camera position/posture at the time of shooting in regard to each transformation target image; and first reference point candidate projecting means which generates projected first reference point candidates in each transformation target image by projecting the first reference point candidates, represented by three-dimensional coordinates, onto the transformation target image based on the camera position/posture estimated by the camera position/posture estimating means, wherein:

the first reference point receiving/determining means receives information on the first reference point candidates represented by three-dimensional coordinates and a determination signal targeted at the projected first reference point candidates displayed on at least one transformation target image based on the information on the first reference point candidates, and the first reference point receiving/determining means receiving the determination signal determines the projected first reference point candidates in each transformation target image, generated based on the information on the first reference point candidates as the projection source of the projected first reference point candidates targeted by the determination signal, as the first reference points in the transformation target image.

(Supplementary Note 5)

The image processing device according to any one of Supplementary notes 1-4, comprising image feature point detecting means which detects image feature points common to a plurality of transformation target images by detecting image feature points in each transformation target image and making a comparison of the detected image feature points between transformation target images, wherein:

the first reference point receiving/determining means receives information specifying the image feature points displayed on the transformation target image as the first reference point candidates and a determination signal targeted at the first reference point candidates which is the specified image feature points, and the first reference point receiving/determining means receiving the determination signal determines the specified image feature points, which are the first reference point candidates targeted by the determination signal, as the first reference points in the transformation target image while also determining image feature points in each transformation target image that are considered to be identical with the image feature points targeted by the determination signal as the first reference points in each transformation target image based on inter-image correspondence relationship of the image feature points targeted by the determination signal.

(Supplementary Note 6)

The image processing device according to any one of Supplementary notes 1-5, wherein the second reference point receiving/determining means receives the information on the second reference points as information common to all the transformed images.

(Supplementary Note 7)

The image processing device according to any one of Supplementary note 1-6, wherein:

the second reference point receiving/determining means receives multiple sets of image coordinates constituting a camera rotation axis in the transformed image as the information on the second reference points, and the first reference point receiving/determining means receives multiple sets of image coordinates or three-dimensional coordinates constituting a camera rotation axis in the transformation target image as the information on the first reference point candidates.

(Supplementary Note 8)

The image processing device according to any one of Supplementary notes 1-7, wherein the geometric transformation means compensates for pixel loss by performing interpolation.

(Supplementary Note 9)

An image processing method for generating a three-dimensional image by conducting geometric transformation to each of transformation target images as a plurality of images containing an object of interest, comprising:

displaying at least one transformation target image by using image display means;

receiving information on first reference point candidates as candidates for first reference points serving for reference in input of geometric transformation according to a user operation;

displaying the first reference point candidates on the transformation target image based on the received information on the first reference point candidates;

receiving a determination signal targeted at the first reference point candidates displayed on the transformation target image according to a user operation;

determining the first reference points based on the information on the first reference point candidates targeted by the received determination signal;

determining second reference points serving for reference in output of the geometric transformation by receiving information on the second reference points; and outputting a transformed image for each transformation target image by conducting the geometric transformation to the transformation target image based on the determined first and second reference points.

(Supplementary Note 10)

The image processing method according to Supplementary note 9, wherein:

the information on the first reference point candidates and the determination signal targeted at the first reference point candidates displayed on the transformation target image based on the information on the first reference point candidates are received in regard to each transformation target image, and the first reference point candidates targeted by the determination signal are determined as the first reference points in the transformation target image when the determination signal is received.

(Supplementary Note 11)

The image processing method according to Supplementary note 9, comprising:

estimating camera position/posture at the time of shooting in regard to each transformation target image;

displaying at least one transformation target image by using the image display means;

receiving information on first reference point candidates represented by three-dimensional coordinates according to a user operation;

displaying projected first reference point candidates, obtained by projecting the first reference point candidates, on the transformation target image based on the received information on the first reference point candidates and the estimated camera position/posture;

receiving a determination signal targeted at the projected first reference point candidates displayed on the transformation target image; and determining the projected first reference point candidates in each transformation target image, generated based on the information on the first reference point candidates as the projection source of the projected first reference point candidates targeted by the determination signal, as the first reference points in the transformation target image when the determination signal is received.

(Supplementary Note 12)

The image processing method according to Supplementary note 9, comprising:

detecting image feature points common to a plurality of transformation target images by detecting image feature points in each transformation target image and making a comparison of the detected image feature points between transformation target images;

displaying the image feature points on at least one transformation target image by using the image display means;

receiving information specifying the image feature points displayed on the transformation target image as the first reference point candidates according to a user operation;

displaying the image feature points specified as the first reference point candidates on at least one transformation target image based on the received information;

receiving a determination signal targeted at the first reference point candidates displayed as the specified image feature points according to a user operation; and determining the specified image feature points, which are the first reference point candidates targeted by the determination signal, as the first reference points in the transformation target image while also determining image feature points in each transformation target image that are considered to be identical with the image feature points targeted by the determination signal as the first reference points in each transformation target image based on inter-image correspondence relationship of the image feature points targeted by the determination signal when the determination signal is received.

(Supplementary Note 13)

An image processing program for generating a three-dimensional image by conducting geometric transformation to each of transformation target images as a plurality of images containing an object of interest, wherein the image processing program causes a computer to execute:

a process of displaying at least one transformation target image by using image display means;

a process of receiving information on first reference point candidates, as candidates for first reference points serving for reference in input of geometric transformation, which is inputted according to a user operation and thereby displaying the first reference point candidates on the transformation target image;

a process of determining the first reference points based on the information on the first reference point candidates targeted by a determination signal when the determination signal, inputted according to a user operation for the first reference point candidates displayed on the transformation target image, is received;

a process of determining second reference points serving for reference in output of the geometric transformation when information on the second reference points is received; and a process of conducting the geometric transformation to the transformation target image based on the first reference points and the second reference points.

(Supplementary Note 14)

The image processing program according to Supplementary note 13, wherein the image processing program causes the computer to execute:

a process of receiving the information on the first reference point candidates in each transformation target image;

a process of displaying the first reference point candidates on the transformation target image for which the information on the first reference point candidates was received; and a process of determining the first reference point candidates targeted by a determination signal as the first reference points in the transformation target image when the determination signal, inputted according to a user operation for the first reference point candidates displayed on the transformation target image, is received.

(Supplementary Note 15)

The image processing program according to Supplementary note 13, wherein the image processing program causes the computer to execute:

a process of estimating camera position/posture at the time of shooting in regard to each transformation target image;

a process of generating projected first reference point candidates in each transformation target image by projecting the first reference point candidates, represented by three-dimensional coordinates, onto the transformation target image based on the estimated camera position/posture;

a process of receiving information on the first reference point candidates represented by three-dimensional coordinates which is inputted according to a user operation and displaying the projected first reference point candidates, generated from the information on the first reference point candidates, on at least one transformation target image; and a process of determining the projected first reference point candidates in each transformation target image, generated based on the information on the first reference point candidates as the projection source of the projected first reference point candidates targeted by a determination signal, as the first reference points in the transformation target image when the determination signal, inputted according to a user operation for the projected first reference point candidates displayed on the transformation target image, is received.

(Supplementary Note 16)

The image processing program according to Supplementary note 13, wherein the image processing program causes the computer to execute:

a process of detecting image feature points common to a plurality of transformation target images by detecting image feature points in each transformation target image and making a comparison of the detected image feature points between transformation target images;

a process of displaying the detected image feature points on at least one transformation target image;

a process of receiving information specifying the image feature points displayed on the transformation target image as the first reference point candidates and displaying the image feature points specified as the first reference point candidates on at least one transformation target image based on the received information; and a process of determining the specified image feature points, which are first reference point candidates targeted by a determination signal, as the first reference points in the transformation target image while also determining image feature points in each transformation target image that are considered to be identical with the image feature points targeted by the determination signal as the first reference points in each transformation target image based on inter-image correspondence relationship of the image feature points targeted by the determination signal when the determination signal targeted at the first reference point candidates as the specified image feature points is received.

While the present invention has been described above with reference to the exemplary embodiments and examples, the present invention is not to be restricted to the particular illustrative exemplary embodiments and examples. A variety of modifications understandable to those skilled in the art can be made to the configuration and details of the present invention within the scope of the present invention.

This application claims priority to Japanese Patent Application No. 2010-121018 filed on May 26, 2010, the entire disclosure of which is incorporated herein by reference.

INDUSTRIAL APPLICABILITY

The present invention is suitably applicable to the purpose of generating images for the three-dimensional display of an object of interest.

REFERENCE SIGNS LIST 11 first reference point receiving means
12 image display means
13 second reference point receiving means
14 geometric transformation method determining means
15 geometric transformation means
21 camera position/posture estimating means
22 first reference point candidate projecting means
31 image feature point detecting means
400 processor
401 program memory
402 storage medium
501 image display means
502 first reference point receiving/determining means
503 second reference point receiving/determining means
504 geometric transformation means

What is claimed is:

1. An image processing device which generates images for three-dimensional display of an object of interest from a plurality of transformation target images containing the object of interest, comprising:

an image display unit which displays at least one transformation target image;

a first reference point receiving/determining unit which receives information on first reference point candidates as candidates for first reference points serving for reference in input of geometric transformation according to a user operation, receives according to a user operation a determination signal targeted at the first reference point candidates displayed on the transformation target image based on the information on the first reference point candidates, and determines the first reference points based on the information on the first reference point candidates targeted by the received determination signal;

a second reference point receiving/determining unit which determines second reference points serving for reference in output of the geometric transformation by receiving information on the second reference points;

a geometric transformation unit which outputs a transformed image by conducting the geometric transformation to the transformation target image based on the first reference points determined by the first reference point receiving/determining unit and the second reference points determined by the second reference point receiving/determining unit;

a camera position/posture estimating unit which estimates camera position/posture at the time of shooting in regard to each transformation target image;

a first reference point candidate projecting unit which generates projected first reference point candidates in each transformation target image by projecting the first reference point candidates, represented by three-dimensional coordinates, onto the transformation target image based on the camera position/posture estimated by the camera position/posture estimating unit, and a processor configured to implement the first reference point receiving/determining unit, the second reference point receiving/determining unit, the geometric transformation unit, and the camera position/posture estimating unit, wherein:

the first reference point receiving/determining unit receives information on the first reference point candidates represented by three-dimensional coordinates and a determination signal targeted at the projected first reference point candidates displayed on at least one transformation target image based on the information on the first reference point candidates, and the first reference point receiving/determining unit receiving the determination signal determines the projected first reference point candidates in each transformation target image, generated based on the information on the first reference point candidates as the projection source of the projected first reference point candidates targeted by the determination signal, as the first reference points in the transformation target image.

2. The image processing device according to claim 1, comprising a geometric transformation method determining unit which calculates parameters of a prescribed geometric transformation equation for each transformation target image based on the first reference points and the second reference points, wherein the geometric transformation unit conducts the geometric transformation to each transformation target image by using a geometric transformation equation according to the parameters calculated by the geometric transformation method determining unit.

3. The image processing device according to claim 1, wherein:

the first reference point receiving/determining unit receives the information on the first reference point candidates and the determination signal targeted at the first reference point candidates displayed on the transformation target image based on the information on the first reference point candidates in regard to each transformation target image, and the first reference point receiving/determining unit receiving the determination signal determines the first reference point candidates targeted by the determination signal as the first reference points in the transformation target image.

4. The image processing device according to claim 1, comprising an image feature point detecting unit which detects image feature points common to a plurality of transformation target images by detecting image feature points in each transformation target image and making a comparison of the detected image feature points between transformation target images, wherein:

the processor is configured to implement the image feature point detecting unit;

the first reference point receiving/determining unit receives information specifying the image feature points displayed on the transformation target image as the first reference point candidates and a determination signal targeted at the first reference point candidates which is the specified image feature points, and the first reference point receiving/determining unit receiving the determination signal determines the specified image feature points, which are the first reference point candidates targeted by the determination signal, as the first reference points in the transformation target image while also determining image feature points in each transformation target image that are considered to be identical with the image feature points targeted by the determination signal as the first reference points in each transformation target image based on inter-image correspondence relationship of the image feature points targeted by the determination signal.

5. The image processing device according to claim 1, wherein the second reference point receiving/determining unit receives the information on the second reference points as information common to all the transformed images.

6. The image processing device according to claim 1, wherein:

the second reference point receiving/determining unit receives multiple sets of image coordinates constituting a camera rotation axis in the transformed image as the information on the second reference points, and the first reference point receiving/determining unit receives multiple sets of image coordinates or three-dimensional coordinates constituting a camera rotation axis in the transformation target image as the information on the first reference point candidates.

7. The image processing device according to claim 1, wherein the geometric transformation unit compensates for pixel loss by performing interpolation.

8. An image processing method for generating a three-dimensional image by conducting geometric transformation to each of transformation target images as a plurality of images containing an object of interest, comprising:

displaying at least one transformation target image by using an image display unit;

receiving information on first reference point candidates as candidates for first reference points serving for reference in input of geometric transformation according to a user operation;

displaying the first reference point candidates on the transformation target image based on the received information on the first reference point candidates;

receiving a determination signal targeted at the first reference point candidates displayed on the transformation target image according to a user operation;

determining the first reference points based on the information on the first reference point candidates targeted by the received determination signal;

determining second reference points serving for reference in output of the geometric transformation by receiving information on the second reference points;

outputting a transformed image for each transformation target image by conducting the geometric transformation to the transformation target image based on the determined first and second reference points;

estimating a camera position/posture at the time of shooting in regard to each transformation target image;

generating projected first reference point candidates in each transformation target image by projecting the first reference point candidates, represented by three-dimensional coordinates, onto the transformation target image based on the estimated camera position/posture;

receiving information on the first reference point candidates represented by three-dimensional coordinates and a determination signal targeted at the projected first reference point candidates displayed on at least one transformation target image based on the information on the first reference point candidates, and determining, according to the received determination signal, the projected first reference point candidates in each transformation target image, wherein the determination signal is generated based on the information on the first reference point candidates as the projection source of the projected first reference point candidates targeted by the determination signal, as the first reference points in the transformation target image.

9. A computer readable information recording medium storing an image processing program for generating a three-dimensional image by conducting geometric transformation to each of transformation target images as a plurality of images containing an object of interest, when executed by a processor, performs a method for:

displaying at least one transformation target image by using an image display unit;

receiving information on first reference point candidates, as candidates for first reference points serving for reference in input of geometric transformation, which is inputted according to a user operation and thereby displaying the first reference point candidates on the transformation target image;

determining the first reference points based on the information on the first reference point candidates targeted by a determination signal when the determination signal, inputted according to a user operation for the first reference point candidates displayed on the transformation target image, is received;

determining second reference points serving for reference in output of the geometric transformation when information on the second reference points is received; and conducting the geometric transformation to the transformation target image based on the first reference points and the second reference points;

estimating a camera position/posture at the time of shooting in regard to each transformation target image;

generating projected first reference point candidates in each transformation target image by projecting the first reference point candidates, represented by three-dimensional coordinates, onto the transformation target image based on the estimated camera position/posture;

receiving information on the first reference point candidates represented by three-dimensional coordinates and a determination signal targeted at the projected first reference point candidates displayed on at least one transformation target image based on the information on the first reference point candidates, and determining, according to the received determination signal, the projected first reference point candidates in each transformation target image, wherein the determination signal is generated based on the information on the first reference point candidates as the projection source of the projected first reference point candidates targeted by the determination signal, as the first reference points in the transformation target image.

* * * * *